PARAMETRON ELEMENT FORMED INTO A BALANCED CIRCUIT

Filed Sept. 4, 1962 2 Sheets-Sheet 1

April 18, 1967 SHINTARO OSHIMA ET AL 3,315,086

PARAMETRON ELEMENT FORMED INTO A BALANCED CIRCUIT

Filed Sept. 4, 1962 2 Sheets-Sheet 2

United States Patent Office 3,315,086
Patented Apr. 18, 1967

3,315,086
PARAMETRON ELEMENT FORMED INTO A BALANCED CIRCUIT

Shintaro Oshima, Musashino-shi, Tokyo-to, Kakuo Futami, Mitaka-shi, Tokyo-to, Takasuke Fukui, Nerima-ku, Tokyo-to, Tetsusaburo Kamibayashi, Kitaadachi-gun, Saitama-ken, and Yoshihisa Komazawa, Shibuya-ku, Tokyo-to, Japan, assignors to Kokusai Denshin Denwa Kabushiki Kaisha, Tokyo-to, Japan, a joint-stock company of Japan Filed Sept. 4, 1962, Ser. No. 221,281
14 Claims. (Cl. 307—88)

This invention relates to improved parametron elements formed into a balanced circuit and more particularly to parametron elements each comprising a balanced circuit which is itself formed into a ring connection by four non-linear inductive members each having a ferro-magnetic substance deposited thereon in the state of a thin film, exciting terminal means for applying exciting current and bias current provided at one pair of two pairs of opposed terminals of said balanced circuit and for exciting parametrically said balanced circuit, output terminal means for deriving output current provided at the other pair of opposed terminals of said balanced circuit, if necessary having a tuning capacitor combined therewith, and input terminal means inductively coupled with said balanced circuit for applying at least one input information signal into said balanced circuit, whereby the output current, having a frequency equal to one half of that of said exciting current and taking one of two phases mutually having a phase difference of $\pi$ in accordance with said input information signal, is derived or generated at the output terminal means.

Conventional parametron elements utilizing the non-linearity of ferro-magnetic substances, which are employed for constructing logic apparatuses such as computers, are usually composed of two cores $M_1$, $M_2$ which have a thickness of about 1 mm. each and outside diameter of about 2 mm. through 4 mm., an exciting winding $L_e$ which has coils wound respectively about 1 through several number of turns, an oscillating winding $L_0$ having a plural number of turns, and a tuning capacitor C as shown in FIG. 1. In this case, an A.C. exciting current $I_{2f}$ and a bias current $I_d$ are made to flow into said exciting winding, whereby an output signal having a frequency equal to one half of that of said exciting current is derived from said oscillating winding, where T is an input transformer and R is a coupling resistance.

On the other hand, high operating speed, low power consumption, wide range of working temperature and miniaturization of elements are desirable. However, the conventional parametron elements have disadvantages which make difficult the attainment of the above-said desirable conditions because of their peculiar characteristics and cumbersome producing process.

It is an essential object of the present invention to provide a new and improved parametron element having none of the above-mentioned disadvantages of the conventional parametron elements by employing a non-linear inductive member such as a wire having ferro-magnetic substance deposited thereon in the state of a thin film.

One object of the present invention is to provide an improved parametron element having high operating speed and low power consumption.

Another object of the present invention is to provide an improved parametron element having a wide range of working temperature and stable operation.

A further object of the present invention is to provide an improved parametron element highly suitable for mass production.

The novel features of this invention are set forth with particularity in the appended claims. This invention, however, both as to its construction and operation together with further objects and advantages thereof, may best be understood by reference to the following description, taken in connection with accompanying drawings, in which the same or equivalent members or currents are designated by the same references, and in which:

FIG. 1 is a schematic connection diagram showing the construction of a conventional parametron element;

FIGS. 2(A) and 2(D) are schematic connection diagrams showing the construction of parametron elements according to the present invention;

FIGS. 2(B) and 2(C) are equivalent circuits for a description of the principle of this invention;

Figure 1:
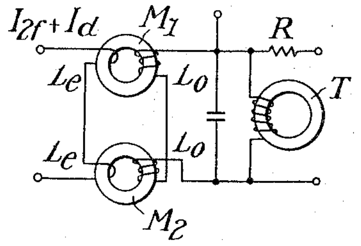
Figure 2A:
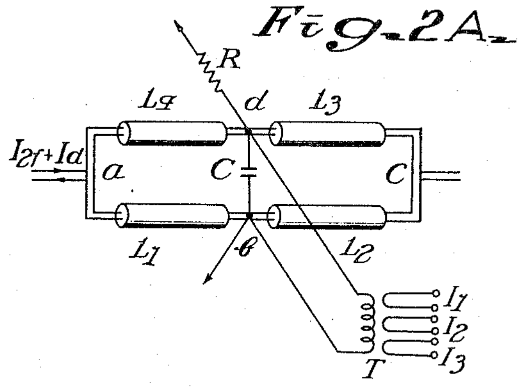

The principle of this invention will first be described with reference to FIGS. 2(A), 2(B), and 2(C). As shown in FIG. 2(A), this element is composed of a balanced circuit which is itself formed into a ring connection by four non-linear inductive members $L_1$, $L_2$, $L_3$, and $L_4$, each having ferro-magnetic substance deposited thereon in the state of a thin film, and a tuning capacitor C connected between one pair of opposed terminals ($b$) and ($d$). Furthermore, an A.C. exciting current $I_{2f}$ and a D.C. bias current $I_d$ are applied to the other pair of opposed terminals ($a$) and ($c$). In this case, an output signal $I_f$ having a frequency equal to one half of that of said exciting current $I_{2f}$ can be derived from said terminals ($b$) and ($d$); where T is an input transformer and R is a coupling resistance. The principle of oscillation of this element will be understood from the following description.

Figure 2B:
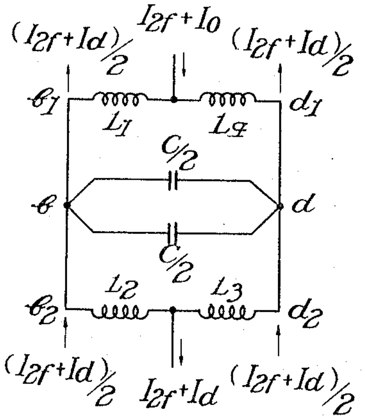

When it is assumed that the tuning capacitor C is a parallel connection of two capacitors each having capacity $C/2$, the equivalent circuit of this element can be drawn as shown in FIG. 2(B). In this FIG. 2(B), the input transformer T and the coupling resistance R are omitted for simplification of illustration. Therefore, when the inductances of the inductive members $L_1$, $L_2$, $L_3$ and $L_4$ are mutually equal, the exciting current $I_{2f}$ and bias current $I_d$ applied to the terminal ($a$) are divided into a pair of currents $(I_{2f}+I_d)/2$ and caused to flow by way of $(L_1-(b)-L_2)$ or $(L_4-(d)-L_3)$ and then superimposed at the terminal ($c$). Since the impedances of the members $L_1$, $L_2$, $L_3$, and $L_4$ referring to the current $(I_{2f}+I_d)/2$ are equal to each other, potentials caused by said current $(I_{2f}+I_d)$ at the terminal ($b$) and the terminal ($d$) are mutually equal, and therefore an output voltage having a frequency $2f$ does not appear between the terminals ($b$) and ($d$). On the other hand, when it is assumed that the currents $(I_{2f}+I_d)/2$ are caused to flow from the terminal ($b_2$) to terminal ($b_1$) and from terminal ($d_2$) to terminal ($d_1$), respectively, said exciting currents $$(I_{2f}+I_d)/2$$

are mutually cancelled between the terminals $(b_2-b-b_1)$ and the terminals $(d_2-d-d_1)$. Accordingly, it can be considered that the current $(I_{2f}+I_d)$ applied to the terminal ($a$) is divided equally and flows to the terminal ($b_1$) or terminal ($d_1$) by way of the member $L_1$ or member $L_4$, respectively. Therefore, with reference to only an exciting current including a bias current, said equivalent circuit as shown in FIG. 2(B) can be converted into divided circuits as shown in FIG. 2(C).

Figure 2C:
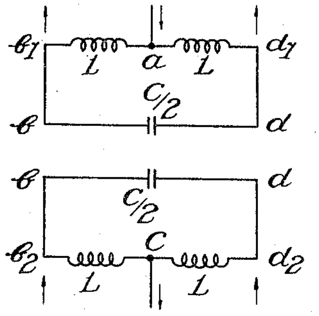

In this FIG. 2(C), the divided circuits are equivalent to the circuit of a conventional parametron element having an exciting winding and an oscillating winding. Accordingly, when the exciting current $I_{2f}$ and bias current $I_d$ are applied to these divided circuits, a frequency component equal to one half of that of the exciting current is generated in these divided circuits because of the non-linear characteristics of the inductive members $L_1$, $L_2$, $L_3$, and $L_4$. Therefore, when the tuning frequency of two inductive members ($L+L=2L$) and the capacitor $C/2$ is selected at a frequency equal to one half of that of the exciting current $I_{2f}$, an oscillating current having a frequency $f$ is derived from the terminals ($b$) and ($d$).

In FIG. 2(A), it is possible to derive, from the terminals ($b$) and ($d$), a current having a frequency $f$ equal to one half of that of the exciting current $I_{2f}$ by applying the exciting current and bias current ($I_{2f}+I_d$) to the terminals ($a$) and ($c$).

Figure 2D:
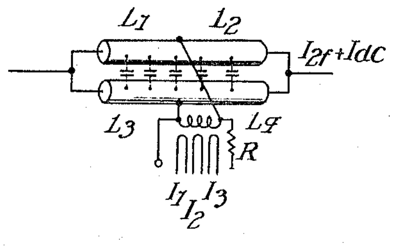

In the above-mentioned embodiment, the tuning capacitor is employed as a tuning member of the oscillating circuit of the parametron element. However, when the operating speed of the parametron becomes higher, and the frequency of the exciting current also becomes higher, the tuning capacitor may be removed and substituted by "distributed stray capacities" of the balanced circuit as shown in FIG. 2(D). With reference to the resonance of the oscillating circuit of this element, it can be understood by analogy of the principle of a "resonant line."

Figure 4:
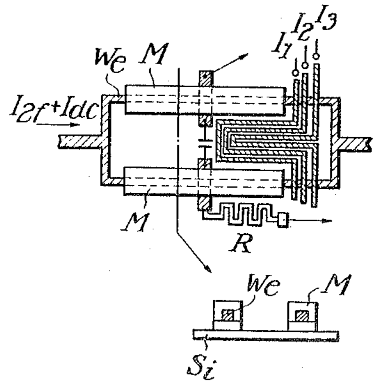
FIG. 4 and FIG. 5(A) are schematic connection diagrams illustrating embodiments of this invention.
Figure 3:
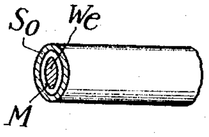
FIG. 3 is a fragmentary perspective view of wire material to be employed as a non-linear member for constructing a parametron element according to the present invention.

Inductive members of the parametron element, according to the present invention, have a peculiar feature wherein a non-linear material, such as a ferro-magnetic substance, is deposited directly on an ordinary conductive wire without insulating material between the conductive wire and the deposited material. The insulating material $S_o$ covers only the outer side of a deposited material M as shown in FIG. 3, where $W_e$ is an ordinary conductive wire material, and M is a non-linear material such as a ferro-magnetic substance. This feature has a desirable advantage in that the inductive members of the parametron can be provided by mass production by utilizing the technique of electroplating or evaporative deposition because of the non-existence of insulating material. Furthermore, since the non-linear material is deposited directly onto the conductive wire of the exciting circuit and of the oscillating circuit of this element, excitation is accomplished by a small exciting power and maximum output current can be obtained. As mentioned above, in the parametron element of this invention, it is not necessary to wind wire on a core or cores in order to provide coils of exciting means and of output means. This is the most important advantage of this invention. In FIG. 4 is shown one embodiment constructed by utilizing the technique of evaporative deposition, where $S_1$ is the substratum to be deposited on the present wire material, M is a deposited non-linear material such as a ferro-magnetic substance, and $W_e$ is the exciting wires on which the deposition is made.

Figure 5A:
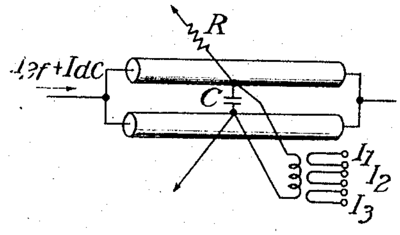
Figure 5B:
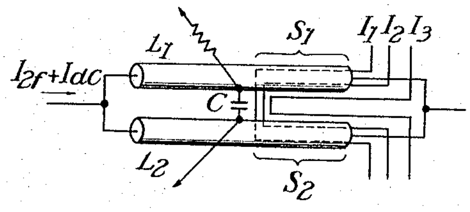
FIG. 5(B) is a schematic connection diagram illustrating a representative embodiment of this invention.

In this paragraph, the input means of these parametron elements for applying input information signals will be described. The embodiment as shown in FIG. 5(A) adopts, as input means, a transformer having an odd number of primary windings similarly as in the input means of conventional parametron elements. On the other hand, in the embodiment as shown in FIG. 5(B), the input means is composed of an odd number of coupling wires $I_1$, $I_2$ and $I_3$. Each of the coupling wires is arranged extremely close to parallel inductive members $L_1$ and $L_2$. However, the coupling wires and said parallel arranged wires must be insulated in all cases. Moreover, the lengths of two wires closely adjoining the coupling wires designated $s_1$ and $s_2$ are equal to each other for effecting symmetrical application of an input signal to the balanced circuit. This condition is required for preventing leakage of exciting current into the input coupling wires.

Figure 6A:
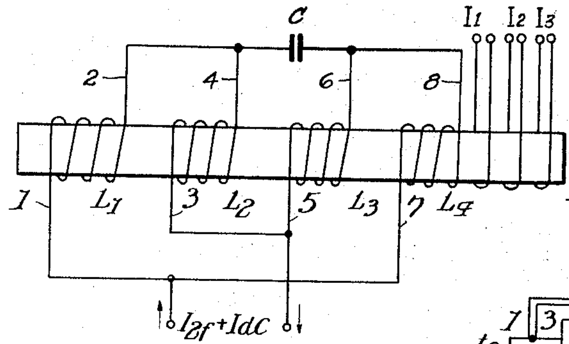
FIGS. 6(A), 6(B), 6(C), and 6(D) are schematic connection diagrams illustrating other embodiments of this invention.

Other embodiments of this invention are shown in FIGS. 6(A), 6(B), 6(C), and 6(D). In FIG. 6(A), the balanced circuit is composed of four wire elements wound so as to form coils $L_1$, $L_2$, $L_3$, and $L_4$. One of the terminals of the coil $L_1$ is connected to one of the terminals of the coil $L_2$. At the same time, one terminal of the coil $L_3$ is connected to one terminal of the coil $L_4$. In other words, two pairs of four terminals 2, 4 and 6, 8 of one side of the wound wire elements ($L_1$, $L_2$, $L_3$ and $L_4$) are respectively connected together, and two terminals of the tuning capacitor C are connected with said two pairs of terminals which are respectively connected together as shown in FIG. 6(A). On the other hand, two pairs of four terminals of the other side of the wound wire elements are respectively connected together so that these pairs of terminals (1, 7 or 3, 5) do not belong to the same group (2, 4 or 6, 8) connected together in one side and employed as exciting terminal means, and the input terminal means is composed of an odd number of coupling wires ($I_1$, $I_2$, and $I_3$) wound on the same bobbin of the wire elements. In the above-said embodiment, the body of the capacitor can be employed as said bobbin on which said wire elements are wound.

Figure 6B:
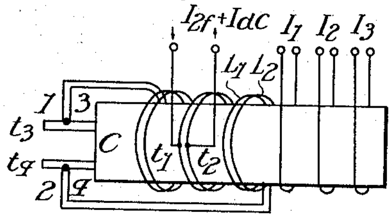
Figure 6C:
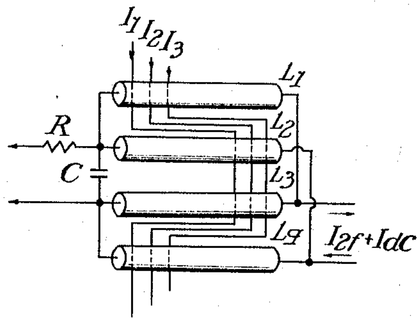
Figure 6D:
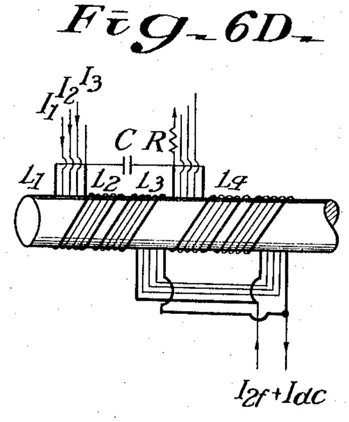

In practice, this embodiment can be constructed as shown in FIG. 6(C) or 6(D). It can be considered that inductive members $L_1$, $L_2$, $L_3$, and $L_4$ shown in FIG. 6(C) are the same as those of the elements shown in FIG. 5(B) because when each of the half parts of the wire elements $L_1$, $L_2$ shown in FIG. 5(B) are turned up at their center points, the elements as shown in FIG. 6(C) can be obtained. Of course, this element constructed as shown in FIG. 6(C) can be used as a parametron element as it is. However, in order to increase the coupling factor between the balanced circuit (inductive members) and the input means (coupling wires), it is preferable that these inductive members and coupling wires are wound on one bobbin as shown in FIG. 6(D).

In the embodiment as shown in FIG. 6(B), the balanced circuit is composed of two coils $L_1$ and $L_2$ wound on one axis, each of which has center taps ($t_1$ and $t_2$) to be employed as exciting terminal means. In this case, one pair of terminals (1, 3) of the two coils is connected together with one terminal ($t_3$) of the tuning capacitor C, and the other pair of terminals (2, 4) of the two coils is connected together with the other terminal ($t_4$) of the tuning capacitor. Similarly as in the aforegoing embodiment shown in FIG. 6(A), the body of the tuning capacitor can be employed as the bobbin on which said wire elements are wound.

As described above, since the parametron elements according to the present invention are constructed by four non-linear inductive members, the amount of variation of the inductance of the inductive members caused by the exciting current increases in comparison with that in the case of a conventional parametron element using one or two inductive members. Accordingly, the parametric excitation factor Γ increases, and the scope possible for oscillation becomes wider; therefore, when a plural number of elements are employed for accomplishing any purpose, the operation is carried out under a very stable condition, and oscillation is easily generated even if the exciting current is small. On the other hand, because of adoption of the balanced circuit, it is possible for exciting current to flow into the resonance circuit itself; therefore, high inductive coupling can be obtained between the exciting side and the oscillating side. Moreover, the above mentioned operations are performed with low power consumption. It is a most important characteristic that the parametron element can be constructed without the process of winding wires on a core or cores.

Obviously many modifications and variations of the present invention are possible in the light of the above disclosure. It is to be understood, therefore, that within the scope of the appended claims the invention may be practiced otherwise than as specifically described.

What we claim is:

1. A parametron element comprising, a balanced circuit having four arms of non-linear inductive members connected in a ring configuration and each having a ferro-magnetic substance deposited thereon as a thin film; exciting terminal means for applying exciting current and bias current provided at one of two pairs of opposed terminals of said balanced circuit and for exciting parametrically said balanced circuit; output terminal means for deriving output current provided at the other pair; tuning means in said balanced circuit for tuning said circuit of a frequency equal to one half of that of said exciting current; and input means inductively coupled with said balanced circuit for applying an odd number of input information signals into said balanced circuit, whereby an output current, having a frequency equal to one half of that of said exciting current and having one of two phases mutually having a phase difference of $\pi$ in accordance with said input information signals, is generated at said output terminal means.

2. A parametron element comprising, a balanced circuit which is formed having four arms of non-linear inductive members connected in a ring configuration and each having a ferro-magnetic substance deposited thereon as a thin film; exciting terminal means for applying exciting current and bias current provided at one of two pairs of opposed terminals of said balanced circuit and for exciting parametrically said balanced circuit; output terminal means for deriving output current provided at the other pair; tuning means consisting of distributed stray capacities; an input means inductively coupled with said balanced circuit for applying an odd number of input information signals into said balanced circuit, whereby an output current, having a frequncy equal to one half of that of said exciting current and having one of two phases mutually having a phase difference of $\pi$ in accordance with said input information signals, is generated at said output terminal means.

3. A parametron element comprising, a balanced circuit having four arms of non-linear inductive members connected in a ring configuration and each having a ferro-magnetic substance deposited thereon as a thin film; exciting terminal means for applying exciting current and bias current provided at one of two pairs of opposed terminals of said balanced circuit and for exciting parametrically said balanced circuit; output terminal means for deriving output current provided at the other pair; tuning means consisting of a lumped tuning capacitor connected with said output terminal means; and input means inductively coupled with said balanced circuit for applying an odd number of input information signals into said balanced circuit, whereby an output current, having a frequency equal to one half of that of said exciting current and having one of two phases mutually having a phase difference of $\pi$ in accordance with said input information signals, is generated at said output terminal means.

4. A parametron element comprising, a balanced circuit having two wire elements connected in parallel in a ring configuration and having center taps and each having a ferro-magnetic thin film deposited thereon without insulating material therebetween; exciting terminal means for applying exciting current and bias current provided at one pair of two pairs of opposed terminals of said balanced circuit and for exciting parametrically said balanced circuit; output terminal means for deriving output current provided at the other pair; said one pair of opposed terminals of said balanced circuit having a tuning capacitor connected therewith; and input terminal means inductively coupled with said balanced circuit for applying at least one input information signal to said balanced circuit, whereby an output current, having a frequency equal to one half of that of said exciting current and having taken one of two phases mutually having a phase difference of $\pi$ in accordance with said input information signal, is generated at said output terminal means.

5. A parametron element according to claim 4, wherein said two wire elements of said balanced circuit comprise two parallel wires approximately equal to each other in length; a terminal on each of said parallel wires connected with an adjacent terminal of the other of said parallel wires; said exciting terminal means being provided at said pair of terminals connected together; each of the output terminals being provided at a position approximately equal to the center tap of each of said wires, and input terminal means comprising means inductively coupling said input terminal means with said parallel wires.

6. A parametron element according to claim 5, wherein said input terminal means comprises a transformer having a secondary winding and the terminals of the secondary winding connected with said output terminals, and said transformer having a primary side provided with an odd number of input windings to which input information signals are applied.

7. A parametron element according to claim 5, wherein said input terminal means comprises an odd number of coupling wires, each of which is arranged to be closely adjoining and insulated from said two wires; the lengths of two wires closely adjoining said coupling wires being mutually equal.

8. A parametron element comprising, a balanced circuit having four wire elements arranged in parallel in a ring configuration and each with a ferro-magnetic thin film deposited thereon without insulating material therebetween; exciting terminal means for applying exciting current and bias current, provided at one of two pairs of opposed terminals of said balanced circuit and for exciting parametrically said balanced circuit; output terminal means for deriving output current provided at the other pair; a tuning capacitor connected to said pair of said opposed terminals of said balanced circuit; tuning means consisting of a lumped capacitor connected with said output terminal means for tuning a frequency equal to one half of that of said exciting current; and input terminal means inductively coupled with said balanced circuit for applying an odd number of input information signals into said balanced circuit, whereby an output current, having a frequency equal to one half of that of said exciting current and having of one of two phases mutually having a phase difference of $\pi$ in accordance with said input information signals, is generated at said output terminal means.

9. A parametron element according to claim 8, wherein said balanced circuit four wire elements are approximately equal to each other in length; four terminals arranged in two pairs on one side of said four wire elements respectively connected together, and two terminals of the tuning capacitor connected with said two pair of terminals respectively connected together, four terminals arranged in two pairs on the other side of said four wire elements respectively connected together so that these pairs of terminals do not belong to the same group connected together in said one side and employed as exciting terminal means, and the input terminal means comprising an odd number of coupling wires, each of which is arranged to closely adjoin and be insulated from said wires with deposited ferro-magnetic thin film, the lengths of the four wires closely adjoining said coupling wires being mutually equal.

10. A parametron element comprising, a balanced circuit having four wire elements wound on at least one bobbin and with a ferro-magnetic thin film deposited thereon without insulating material therebetween; said balanced circuit comprising two pairs of opposed terminals; exciting terminal means for applying exciting current and bias current provided at one pair of said two pairs of opposed terminals of said balanced circuit and for exciting parametrically said balanced circuit; output terminal means for deriving output current provided at the other pair; said one pair of opposed terminals of said balanced circuit having a tuning capacitor connected therewith; and input terminal means inductively coupled with said balanced circuit for applying at least one input information signal into said balanced circuit, whereby an output current, having a frequency equal to one half of that of said exciting current and having one of two phases mutually having a phase difference of $\pi$ in accordance with said input information signals, is generated at said output terminal means.

11. A parametron element according to claim 10, wherein said balanced circuit comprises said four wire elements wound on one bobbin and two pairs of four terminals on one side of said wound wire elements respectively connected together, and a tuning capacitor having two terminals connected with said two pairs of terminals respectively connected together, four terminals arranged in two pairs on the other side of said wound wire elements respectively connected together so that these pairs of terminals do not belong to the same group connected together in said one side and employed as exciting terminal means, and the input terminal means comprising an odd number of coupling wires wound on the same bobbin of said wire elements.

12. A parametron element according to claim 11, wherein the tuning capacitor is employed as said bobbin on which said wire elements are wound.

13. A parametron element according to claim 10, wherein said balanced circuit is composed of two coils wound on one bobbin, each of which has a center tap employed as the exciting terminal means, one pair of terminals of said two coils connected together with one terminal of the tuning capacitor, and the other pair of terminals of said two coils connected together with the other terminal of the tuning capacitor.

14. A parametron element according to claim 13, wherein said tuning capacitor is employed as said bobbin on which said wire elements are wound.

No references cited.

BERNARD KONICK, *Primary Examiner.*

JAMES W. MOFFITT, *Examiner.*